United States Patent
Dunn et al.

[11] Patent Number: 6,118,780
[45] Date of Patent: Sep. 12, 2000

[54] COMMUNICATION NETWORK AND METHOD OF OPERATION FOR REAL TIME USER SELECTION OF VOICE AND/OR DATA PATHS IN THE NETWORK

[75] Inventors: James M. Dunn, Ocean Ridge, Fla.;
Alan G. Ganek, Chappaqua, N.Y.;
Edith H. Stern, Boca Raton, Fla.;
Barry E. Willner, Briarcliff Manor, N.Y.

[73] Assignee: International Business Machines Corporation, Armonk, N.Y.

[21] Appl. No.: 08/819,505

[22] Filed: Mar. 17, 1997

[51] Int. Cl.[7] .............................. H04J 3/02; H04L 12/66
[52] U.S. Cl. ...................... 370/355; 370/493; 370/529; 370/537
[58] Field of Search ...................... 370/352, 353, 370/354, 355, 356, 357, 360, 422, 465, 494, 495, 527, 528, 529, 532, 537, 538, 540, 493

[56] References Cited

U.S. PATENT DOCUMENTS

| | | | |
|---|---|---|---|
| 4,864,494 | 9/1989 | Kobus, Jr. ............................. | 364/200 |
| 5,519,778 | 5/1996 | Leighton et al. ...................... | 380/30 |
| 5,610,910 | 3/1997 | Focsaneanu et al. .................. | 370/351 |
| 5,654,957 | 8/1997 | Koyama ................................ | 370/355 |
| 5,838,682 | 11/1998 | Dekelbaum et al. .................. | 370/401 |
| 5,867,485 | 2/1999 | Chambers et al. ..................... | 370/281 |
| 5,916,302 | 6/1999 | Dunn et al. ........................... | 709/204 |

*Primary Examiner*—Chi H. Pham
*Assistant Examiner*—Kwang B. Yao
*Attorney, Agent, or Firm*—Joseph C. Redmond, Jr.; Morgan & Finnegan, LLP

[57] ABSTRACT

A user through a personal computer, in real time, controls the activation and selection of voice and data transmission paths in a communication network independent of network profiles. The network includes a public switched telephone network and a data network, e.g. the Internet for voice and/or data transmissions over either the voice or data networks. In the network, a voice terminal and a computer terminal are coupled to a shared voice and data terminal. A digital subscriber line access multiplexer is coupled to the shared voice and data terminal; the data network through a client server interface, and a voice network through an intelligent switch. The client server interface includes programmable stored data descriptive of network-authorized data and voice functions and transmission paths in the voice and data networks. The interface is linked to the multiplexer and switch for transmitting signaling messages directing traffic to the voice and data networks in accordance with the stored data. The computer terminal displays menus obtained from the client server which enable the user, in real time, to activate and select voice and/or data transmission paths through either the voice and/or data networks independent of pre-defined network profiles and/or traditional traffic assumptions.

15 Claims, 9 Drawing Sheets

COMMUNICATION NETWORK AND METHOD OF OPERATION FOR REAL TIME USER SELECTION OF VOICE AND/OR DATA PATHS IN THE NETWORK

CROSS-REFERENCE TO RELATED APPLICATION

This application is related to the following co-pending patent application, assigned to the assignee of the present invention and incorporated herein by reference:

application Ser. No. 08/761,257 (Docket BC9-96-059) entitled "User Invocation Of Services In Public Switched Telephone Network Via Parallel Data Networks" by J. M. Dunn et al, filed Dec. 6, 1996, discloses a telephone service management facility which allows customers and other users of the Public Switched Telephone Network (PSTN) to enable, disable or modify special services provided by the PSTN without assistance of telephone company operators.

BACKGROUND OF THE INVENTION

1. Field of the Invention

This invention relates to communications systems. More particularly, the invention relates to systems and methods of operation for real time user selection of voice and/or data paths in a communication network independent of pre-defined network profiles and offerings.

2. Background Discussion

In today's telephony and data networks, availability of features and definition of what types of traffic are carried by which networks is controlled by either pre-authorized telephony features (e.g., call following, call trace, etc.) or by dialing into specific service providers for special data services (e.g., dialing into an internet provider for internet service). In these instances, the call processing roles are set in advance, usually by a carrier's service representative. In almost all cases, data traffic is carried by special data networks; and other traffic (voice, fax, video) is carried by circuit switched ("voice") networks. For telephone voice networks, there are Advanced Intelligent Network (AIN) profiles which define the voice services available to the subscriber on the telephone system. For data networks, both in telephone companies and in private carriers, there are Software Defined Network (SDN) offerings available to the user on the network. The profiles and offerings are predetermined network configurations that an end user can select among, based on their needs. The typical offering changes routes and capacities, and users are required to log on to an administrative system in the carrier to change from one profile or offering to another. The basic control element for AIN and SDN functions are within the specific carrier, and capabilities must be established in advance of using them.

User voice and data communication needs change almost on a daily basis as workload demands change. The delay in adjusting a user's communication needs by dealing in advance with the telephone company or service provider to increase or decrease bandwidth or transmission paths for voice and data through the network handicaps the user in serving his own or customer needs as the situation demands. Accordingly, a need exists for a user to have the ability to select the type, bandwidth, transmission path and level of service for his voice and/or data communications needs on a real time basis independent of pre-defined network profiles and/or traditional traffic assumptions.

SUMMARY OF THE INVENTION

An object of the invention is a communication network and method of operation which enables a user to select, in real time and prior to use, voice and/or data communications needs and transmission paths in the network, independent of pre-defined network profiles.

Another object is a user-controlled interface for selecting, in real time, the type of service for voice and/or data transmissions in a communication network.

Another object is a user-operated computer terminal for selecting, in real time, a path of voice and/or data transmissions in a voice or data network.

Another object is a programmable client server interface in a communication network for directing traffic, in real time, between voice and/or data paths, according to user selections and independent of pre-defined network configurations.

Another object is a communication network and method of operation using computer-displayed menus for enabling a user to direct voice and/or data transmission in the network in real time without resorting to network defaults.

These and other objects, features, and advantages are achieved in a communication network for voice and/or data including a voice terminal and a computer terminal coupled to a shared voice and data terminal. A digital signal line access multiplexer is coupled to the shared voice and data terminal. The multiplexer is also coupled to a data network through a client server interface and a voice network through an intelligent switch. The client server interface includes programmable stored data descriptive of network-authorized data and voice functions and transmission paths in the voice and data networks. The interface is linked to the multiplexer and switch for directing traffic to the voice and data networks in accordance with the stored data. Service control means are linked to the client server interface, the switch and the voice network through signalling paths for directing traffic on the voice network as directed by the client server. The computer terminal includes means for displaying menus obtained from the client server interface indicating network-authorized services and available transmission paths through the voice and data networks. The menus enable a user to activate and select voice and/or data transmission paths through either the voice and/or data networks without network pre-authorization and independent of network management.

DESCRIPTION OF THE DRAWING

The invention will be further understood from the following description of a preferred embodiment taken in conjunction with the appended drawing, in which:

FIGS. 3C1–C3 are flow diagrams for controlling the transmission of voice and/or data from a user to the voice and/or data networks in the system of FIG. 3A.

FIGS. 3D(1)–3D(6) are flow diagrams for directing incoming voice and/or data traffic received by a user from the voice and/or data networks in the system of FIG. 3A.

DESCRIPTION OF PREFERRED EMBODIMENT

Before describing the present invention, it is believed appropriate to provide some background in present voice and data systems and practices used by communication networks, particularly telephone companies, in handling such transmissions or calls to and from customers and users. With this background, the advantages and features of the present invention will be more fully appreciated.

Figure 1:
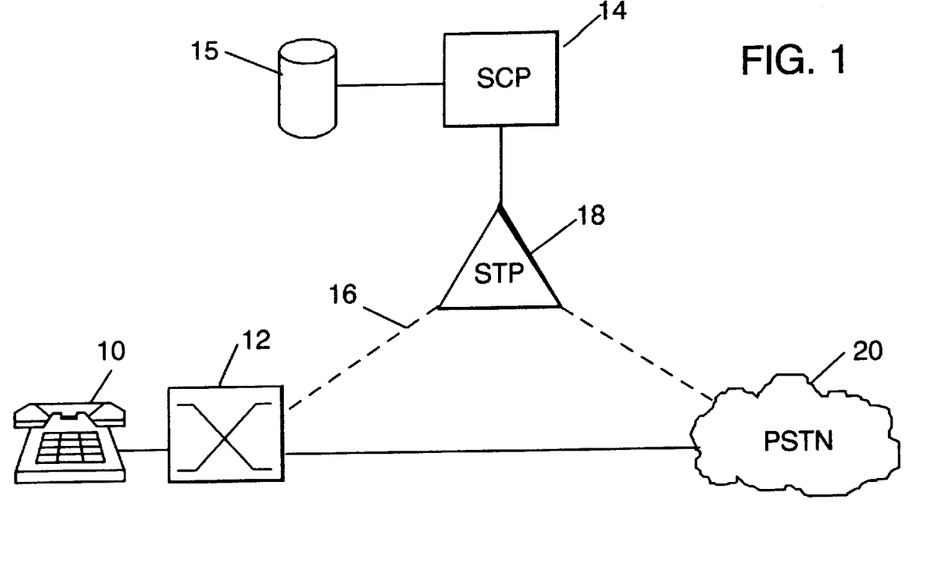
FIG. 1 is a block diagram of a prior art system for handling voice traffic in a telephone network.

In FIG. 1, a telephone 10 is shown as part of an advanced intelligent network (AIN). A call originating from the telephone is transmitted to a central office switch 12 which contains a Signal Switching Point (SSP) (not shown) which sends a message to a Service Control Point (SCP) 14 requesting instructions for processing the telephone call. The message is sent over a signal link 16 by way of a signal transfer point 18 which shuttles messages between the SSP and the SCP. The SCP is a computer that holds data bases 15 in which customer-specific information or user profiles are used by the network to route calls. The SCP 14 network directions are based on the user identification (ID) and profile which determine the call processing rules to apply. Based upon the user profile, the SCP sends a message to the switch 12 to process the call accordingly. The SCP also sends a message over the message link 16 to a Public Switch Telephone Network (PSTN) 20 for processing the call transmitted by the switch 12. A user has little or no control over the call transmission routing or type of service or bandwidth except through contact with the telephone company to change the user profile stored in the SCP.

Figure 2:
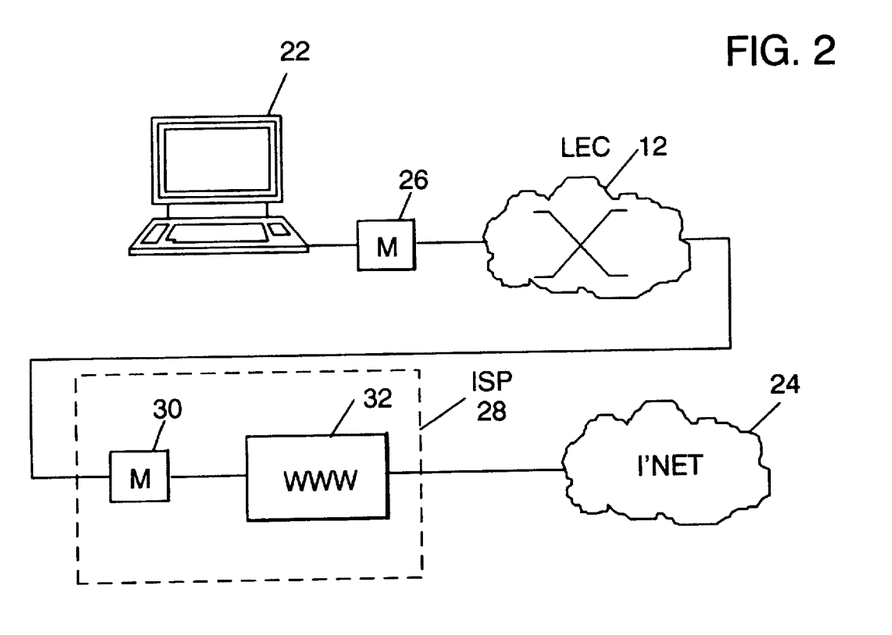
FIG. 2 is a block diagram of a prior art system for handling data traffic in a data network.

A typical system for handling data transmissions is shown in FIG. 2. A computer 22 or other data terminal equipment is connected to a data network 24, e.g., the Internet or any other data network, via a modem or gateway 26. Typically, the modem 26 is connected to a carrier 12 (the local telephone company) for access to an information service provider 28. For a dial-in data network, the local telephone switch 12 is the first point of contact. Based on the dialed digits, the call is routed through the telephone company to an outlet that connects to the information service provider. If the data session was through a gateway and a leased line, the access network would be the telephone company and the circuit can either be passed through the switch or by-pass the switch and go right to the information service provider. In either case, the data call goes through a portion of the voice network to get to the data network. The service provider 28 includes a modem 30 for receiving the data call and is connected in the case of the Internet to a world-wide web server 32 for accessing the data network 24. Again, to change the routing, level of service and bandwidth, the user must deal with the telephone company to make changes to his user profile and deal with the information provider to change his software-defined network.

The present invention overcomes the limitations and restrictions of the prior art systems shown in FIGS. 1 and 2. Specifically, FIG. 3A shows a modification of the basic voice and data networks which allows external user data applications to control which network, voice or data, carries which type of traffic.

Figure 3A:
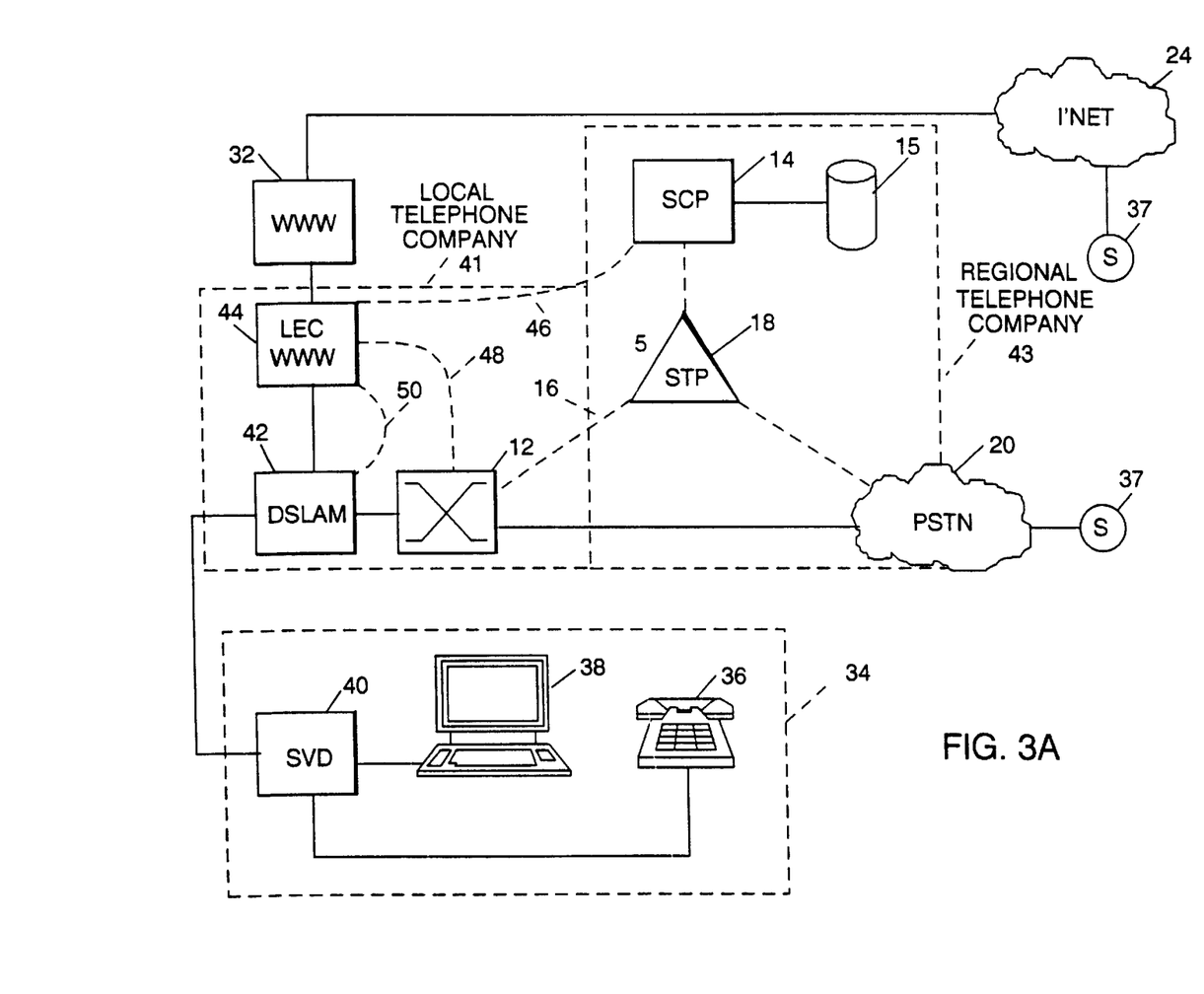
FIG. 3A is a block diagram of a communication network including a client server interface enabling a user to select access in real time to either voice or data transmission paths in the network and incorporating the principles of the present invention.

In FIG. 3A, a public switch telephone voice network 20 and a data network 24, such as the Internet, have been modified in accordance with the principles of the present invention to enable a user to alter in real time his AIN profile to select the path for transmitting voice or data to a subscriber 37 coupled to the networks 20 and 24. In one form, a user station 34 includes a standard telephone 36 and a computer 38, both devices coupled through a shared voice/data terminal 40 to a local telephone company 41. The devices 36, 38 and 40 are well known in the art. The output of the terminal 40 is received by a Digital Subscriber Line Access Multiplexer (DSLAM) 42. The multiplexer 42 supports Asymmetric Digital Subscriber Line (ADSL) technology or any other broadband technology which allows one or more voice channels and high speed data channels to be connected in the same session on the same connection. The multiplexer 42 functions to multiplex and de-multiplex the various data streams and put them on the proper data or voice networks. Typically, the voice channels are predetermined to go to the basic Telco switch and the data channels are predetermined to go to a data network access point. Such multiplexers 42 are well known in the art and manufactured by several companies including Westel, Motorola, Lucent, and others. However, DSLAM devices 42 with code modification as described herein allow external control of voice and data on a per-event routing. One output of the switch 12 is provided to the network 20 under the control of an SCP 14 and STP 18 through signalling links 16 as described in connection with FIG. 1. The second output from the multiplexer 42 is provided to the network 24 through a world-wide server 32 and a local exchange world-wide web server and interface 44. The server 44 is standard and establishes a programmable client server relation with the user station 34. The client server interface 44 is further linked to the SCP 14, switch 12 and multiplexer 42 through signalling paths 46, 48 and 50, respectively in the local or regional Telco 43. The server interface contains programmable stored instructions for effecting the transfer of voice or data to the networks 20 and 24, in accordance with the policies of the local telephone company, as modified by negotiations between the user and the telephone company.

In use the user logs in to the server 44 which presents a menu of allowed functions as authorized by the local telephone company. If the functions offered are all local to the switch and/or the device 42, the server can interact directly with these devices through signalling paths 48 and 50 to activate the required features. If the functions are controlled by the SCP, the server can link to the SCP 14 to alter the AIN profile as described earlier. In those instances where the local operating companies allow data networks to carry voice and voice networks to carry data, the end user application made available by the server 44 enables the user in real time to select the serving network from menus presented to the user by the client server interface. The menus (not shown) are displayed at the computer terminal 38 and define the authorized services and transmission paths as negotiated by the user with the local telephone company or service provider, as the case may be. The menus can be changed by the user as his voice and data needs change. Thus, the client server interface 44 enables a user to select and direct the incoming/outgoing traffic and routes voice or data to the network 20 via the switch 12 or to the data network 24 via the server 32. The client server is linked to the multiplexer through a signalling path. An intelligent switch is coupled at one end to the multiplexer and at the other end to the voice network.

Figure 3B:
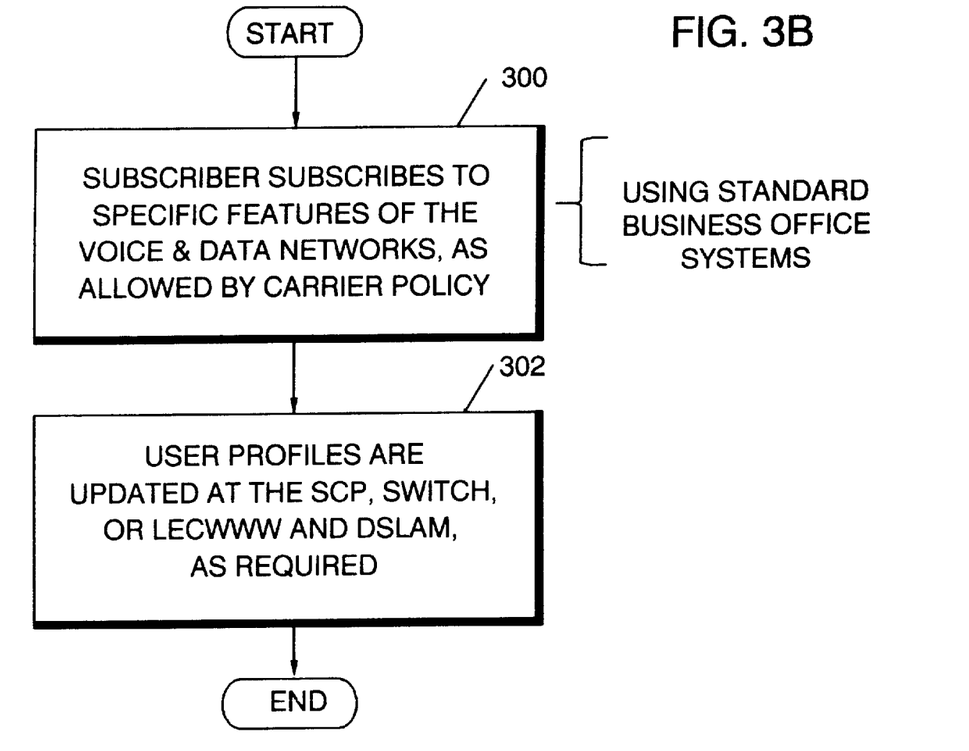
FIG. 3B is a flow diagram for initiating the operation of FIG. 3A.

The operation of FIG. 3A will now be described in conjunction with FIGS. 3B; 3C(1)–(4); and 3D (1)–(4). In FIG. 3B, end user control of voice and data in the PSTN 20 and the data network 24 is initiated in a step 300 in which a user or subscriber negotiates with the local telephone company for the bandwidth, level of service and voice and data paths authorized by the telephone company policies. Based upon the user-Telco negotiations, a step 302 is performed by the telephone company or user, as the case may be, to program an update of the user AIN profiles at the SCP 14, switch 12, the client server interface 44 and the multiplexer 42, as required.

Voice or data traffic originated at the user station 34 for the networks 20, 24 will now be described in conjunction with FIGS. 3C(1)–3C(3). The status of the user station 34 is determined in step 304. A "yes" condition indicates that traffic is being received and directs the voice or data traffic to node C which initiates the receiving process to be described in conjunction with FIGS. 3D(1)–3D(4). If a "no" condition exists, the user station is idle and the user may decide to initiate traffic in a step 306 using PC client code screens provided by the server 44 after connection thereto. Step 308 determines whether telephone or voice traffic is to be initiated. A "yes" condition sets a voice only indicator in the client code in an operation 310 after which the program transfers to node "A". A "no" condition initiates a test for a data transmission in step 312. A "yes" condition initiates a step 314 which sets a "data only" indicator in the client code after which the program transfers to node "A". A "no" condition initiates a step 316 which sets a "data and voice indicator" in the client code after which the program transfers to node "A".

Figure 3C:
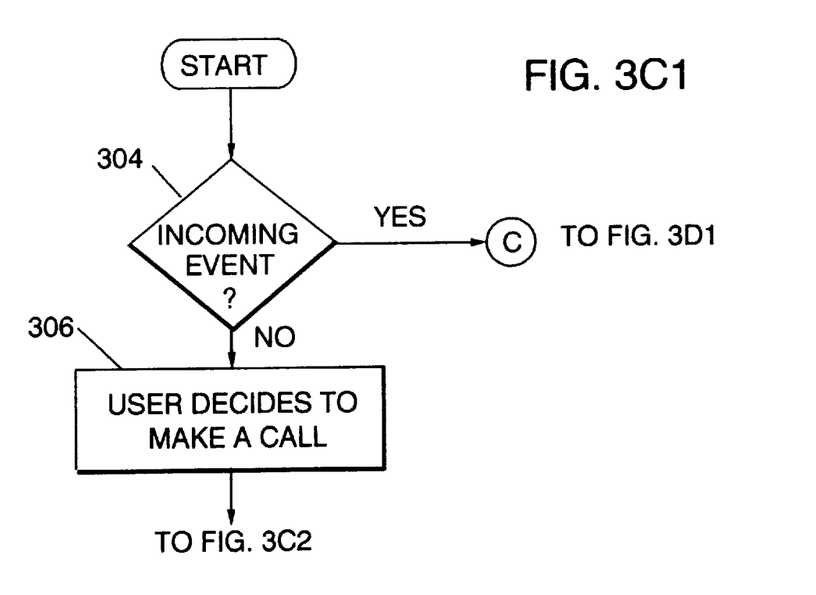
Figure 3C:
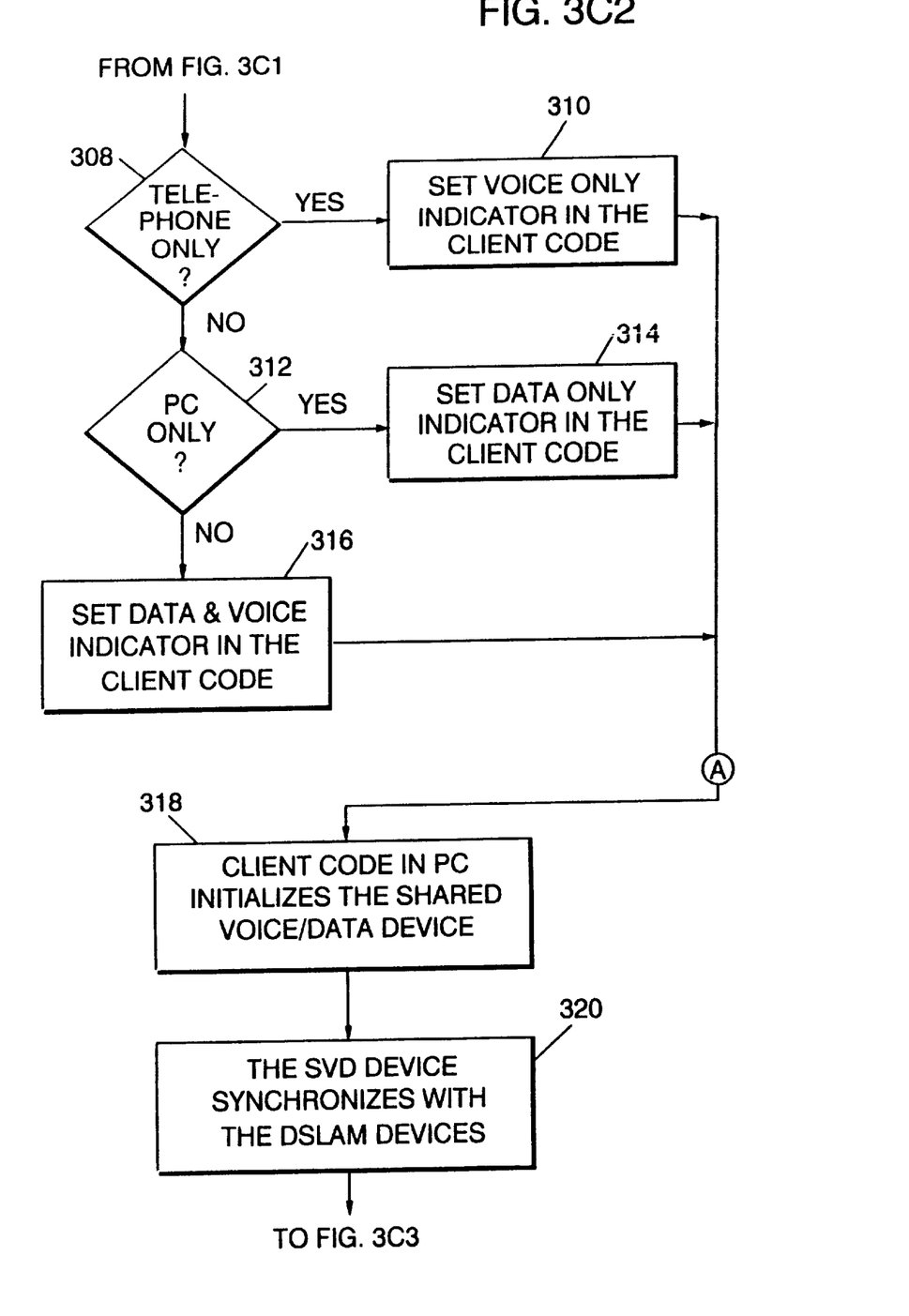
Figure 3C:
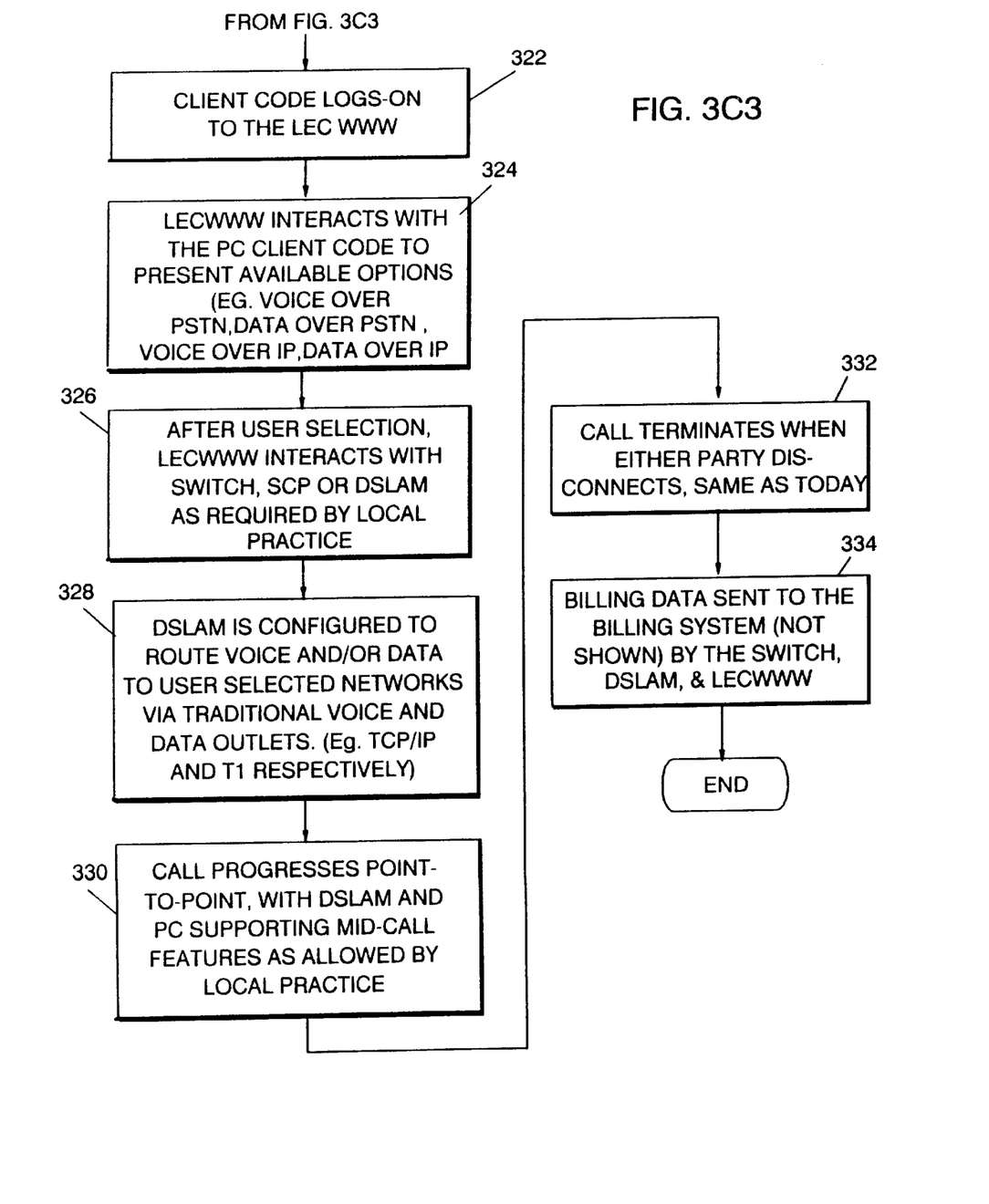

In step 318, the client code in the computer 38 initializes the shared voice/data device 40. The device 40, in a step 320, activates the multiplexer 42 for directing the voice and/or data traffic originating from the user station 34. In a step 322, the client code logs on to the client server interface 44 for access to available traffic functions in the networks 20 and 24. In a step 324, the server interacts with the PC client code by providing the user station 34 with menus listing voice and/or data transmissions paths available to the user, e.g., voice over PSTN, data over PSTN, voice over IP, data over IP. In a step 326, the client server interface 44 interacts with the switch 12 or SCP 14 or multiplexer 42 through signalling paths 48, 46 and 50, respectively, to alter the routing of voice and data paths in accordance with the user's selection presented by the server to the user in step 324.

In a step 328, the multiplexer 42 is configured to route voice and/or data traffic through the user-selected networks via conventional voice and data paths. For example, TCP/IP and T1, respectively.

In a step 330, the voice or data traffic progresses point-to-point in the networks 20 or 24, as the case may be, with the multiplexer and the user station supporting mid-call features as authorized by the local telephone company practice.

In a step 332, the traffic terminates when either the sending or receiving party disconnects and the routing path is deactivated by the networks 20 and 24 in accordance with standard practices.

In a step 334, the billing data for the voice or data transmission is sent to a billing system (not shown) by the switch, multiplexer and server 44, after which the transmission process ends.

In FIGS. 3D(1)–3D(4), the process of receiving voice or data traffic by the user station 34 which is entered at node C will now be described. Incoming voice and data traffic from the networks 20 and 24 are routed to the multiplexer 42 in a step 336. The type of traffic is determined in steps 338, 340 and 342, to be described hereinafter.

Figure 3D:
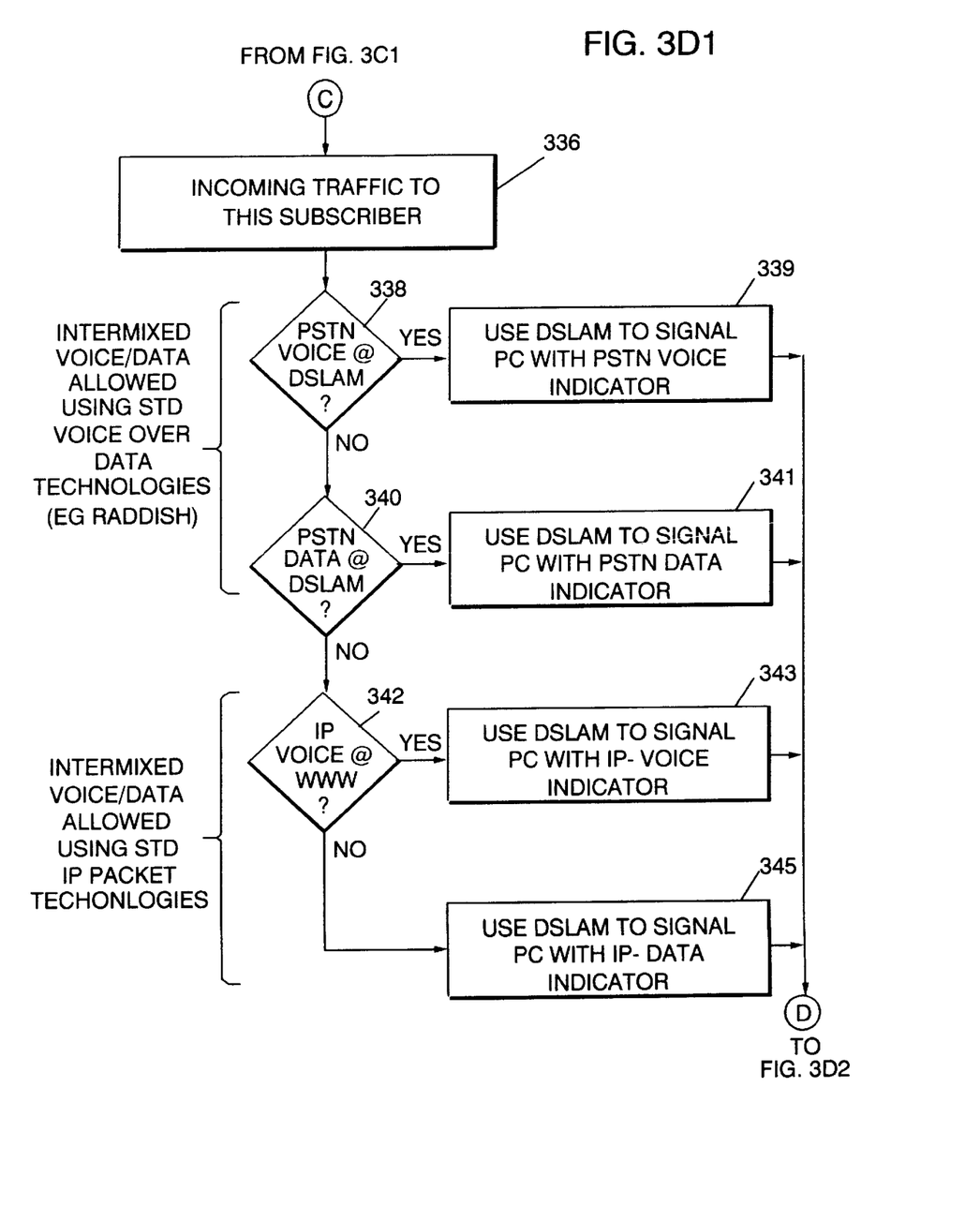

In a step 338, the multiplexer 44 tests the traffic for voice data. A "yes" condition initiates a step 339 in which the multiplexer provides a PSTN voice indicator signal to the computer 38, after which the program transfers to node "D". A "no" condition initiates a data test in the PSTN in a step 340.

In the step 340, the multiplexer tests the PSTN traffic for data. In either steps 338 or 340, voice and data may be intermixed using standard voice over data technologies. A "yes" condition initiates a step 341 in which the multiplexer 42 signals the PC 38 with a data indicator in the PSTN network, after which the program transfers to node "D". A "no" condition initiates a voice test in the data network in a step 342.

In step 342, the network traffic is tested at the multiplexer to determine if the data from the data network is voice. Again, the traffic may be intermixed voice and data as allowed using standard Internet protocol packet technologies. A "yes" condition for the step 342 initiates step 343 in which the multiplexer signals the PC 38 with an IP voice indicator after which the program transfers to node "D". A "no" condition initiates step 345 in which the multiplexer signals the PC with a data indicator for the data network after which the program transfers to node "D".

Figure 3D:
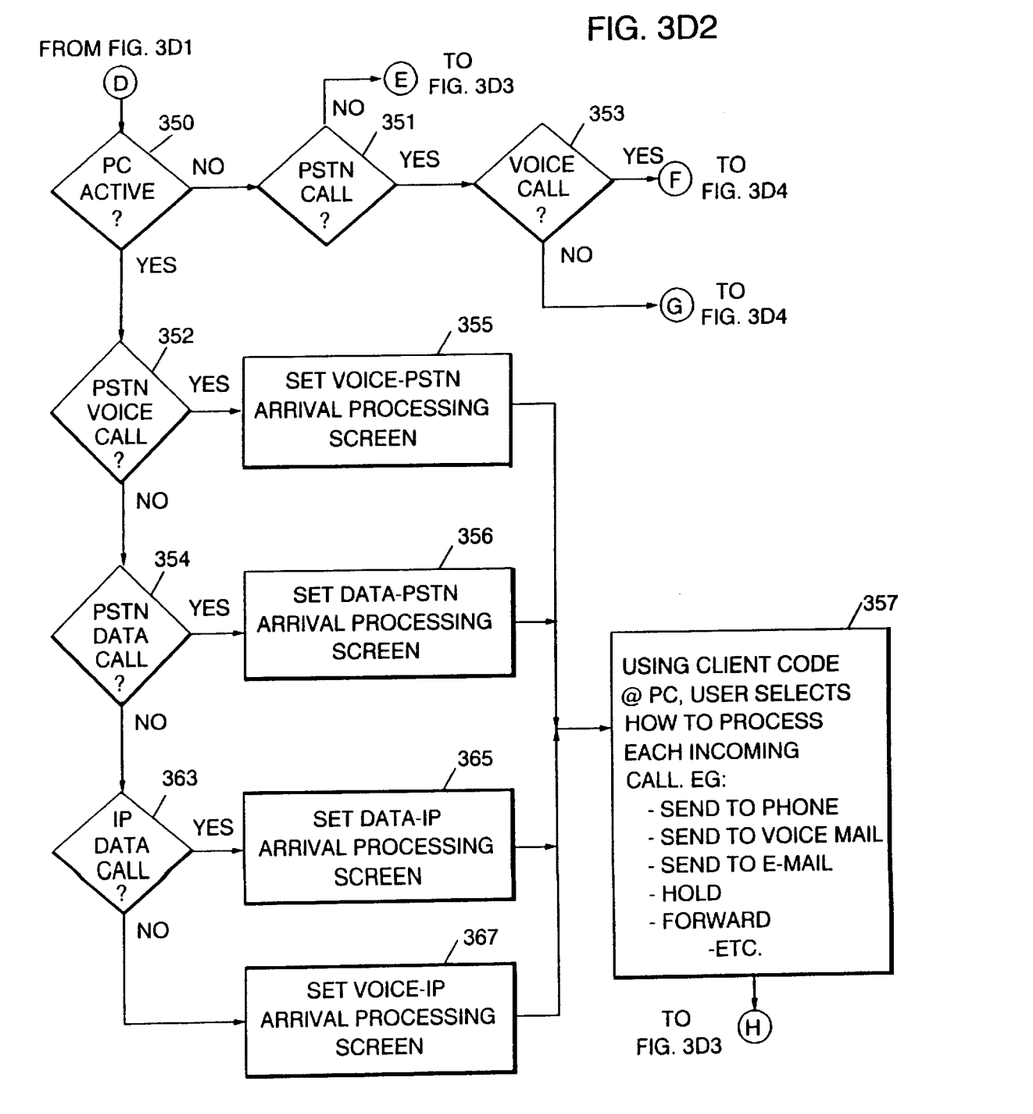
Figure 3D:
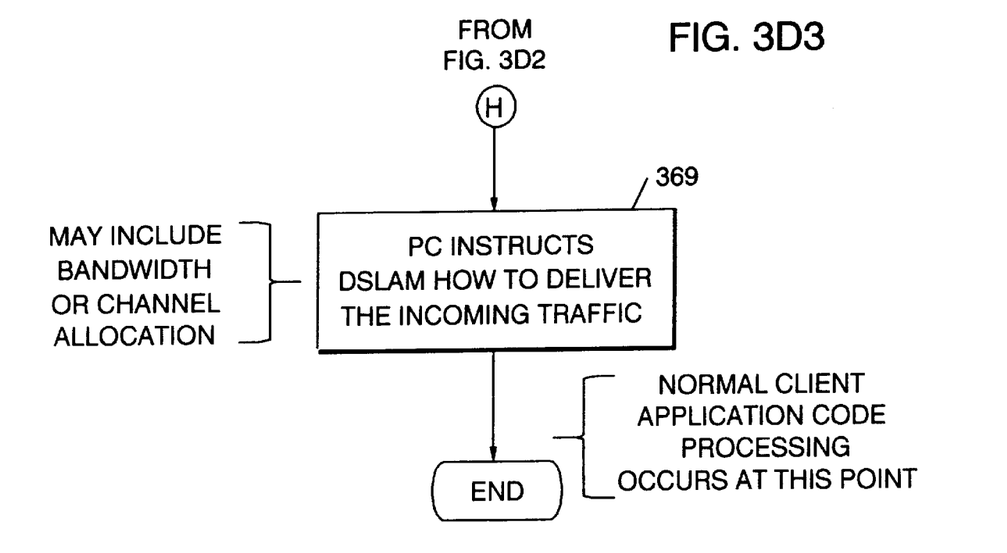

At node "D" the program initiates a step 350 in which the user station is tested to determine whether or not the PC 38 is active. A "no" condition, initiates a test 351 to determine whether a voice or PSTN network call has been received. A "yes" condition initiates a test 353 to determine whether the call is a voice call. A "yes" condition transfers the program to node "F". A "no" condition transfers the program to node "G".

A "yes" condition for step 350 initiates a step 352 which determines if the voice call indicator has been received. A "yes" condition initiates step 355 which sets a PSTN voice network arrival processing screen on the computer. After which, a step 357 is initiated to transfer the traffic to the phone or voice mail or e-mail or hold or forward, as the case may be. A "no" condition for the step 352 initiates a step 354 in which the PSTN traffic is tested for network data. A "yes" condition initiates a step 356 which initiates a set data network arrival processing screen on the computer 38, after which the process transfers to the step 357. A "no" condition for the step 354 initiates a step 363 which tests the data network indicator for a data network call. A "yes" condition initiates a step 365 which sets a data network arrival processing screen for data on the computer 38, after which the program transfers to step 357.

A "no" condition for the step 363 initiates a step 367 which sets a data network arrival processing screen for voice on the computer, after which the process transfers to step 357.

After completion of the step 357 for the different voice or data transmissions on the voice or data network, the process transfer to node H in FIG. 3D3 at which the computer in step 369 instructs the multiplexer in the delivery of the incoming traffic to the user station 34. The instructions may include bandwidth or channel allocation for the computer, after which the process ends using normal client application code processing.

Figure 3D:
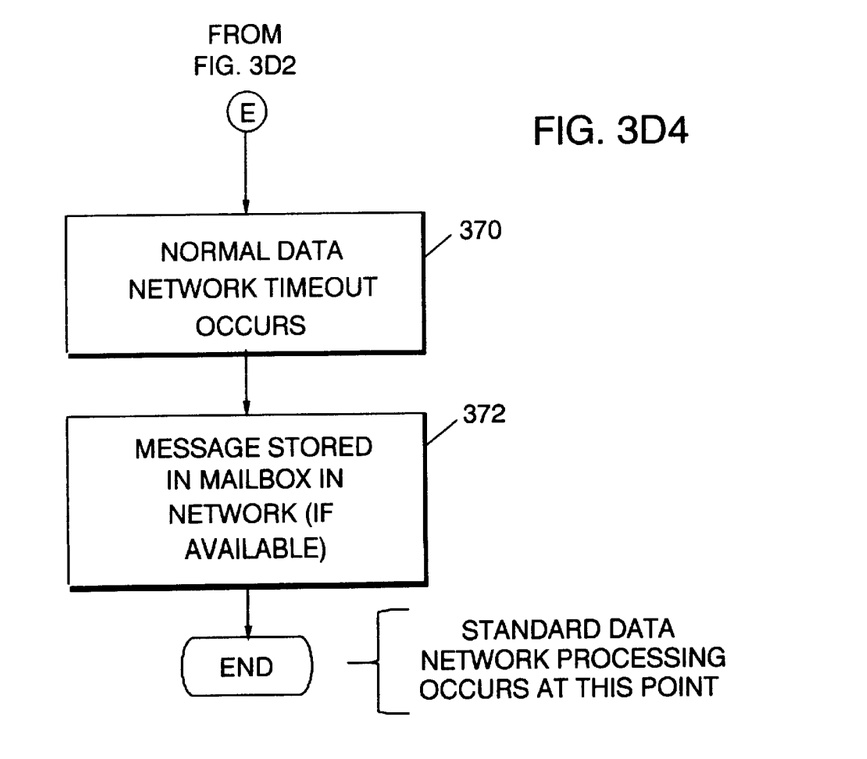

Returning to the step 351, in FIG. 3D2, the node "E" initiates a step 370 in FIG. 3D4 to provide for a normal data network time out. Upon completion of the step 370, a step 372 is initiated to store the message in a network mailbox using standard data network processing, after which the process ends.

Figure 3D:
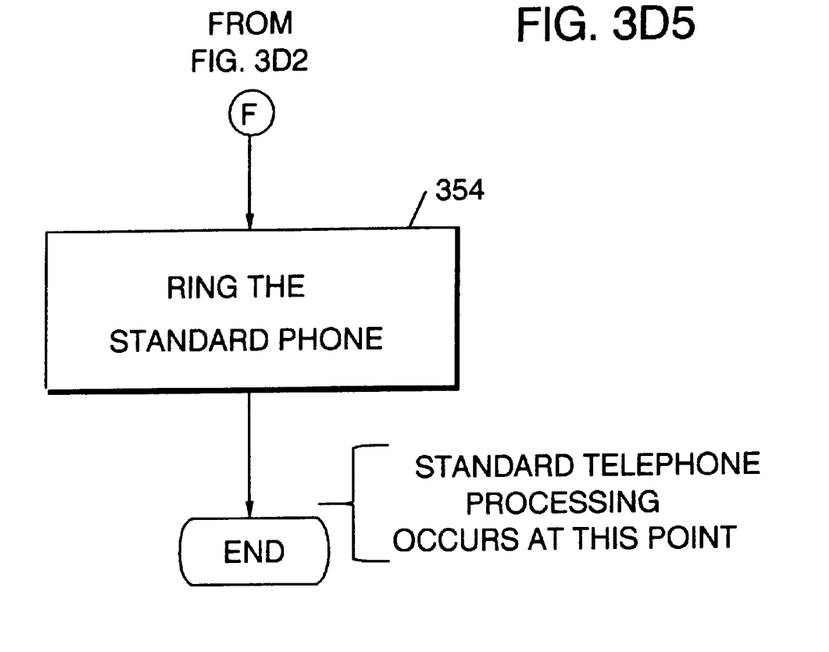
Figure 3D:
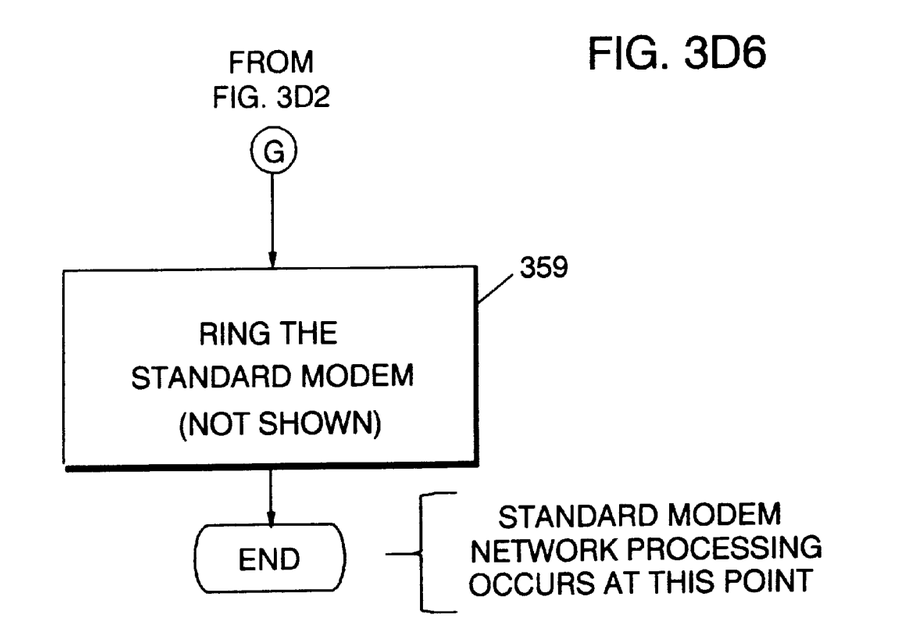

Returning to the step 353 in FIG. 3D2 a "yes" condition initiates the transfer of the process to node "F" in FIG. 3D5 at which a step 354 is initiated to ring the telephone 36 using standard telephone practices, after which the process ends. A "no" condition for step 353 initiates the transfer of the process to node "G" in FIG. 3D6 at which a standard demodulation process is executed by the modem in a step 359, after which the process ends.

Summarizing, the present invention has the ability for the user to control the voice and data network functions on a call-by-call basis via an external data application contained in the server 44. The invention has the further ability to direct traffic associated with one network to the other network and enables the user to actively select which network will carry which type of traffic, even as the call is being established. Finally, the client server interface 44 enables the transmission functions to be programmed on a call-by-call basis to control the SCP and multiplexer 42 in directing the voice and data traffic from the user to the networks 20, 24 to serve the best interests of the user.

While the invention has been described in a specific embodiment, various changes may be made without departing from the spirit and scope of the invention, as defined in the appended claim in which:

We claim:

1. A communication system for voice and/or data having user activation and selection, in real time, of transmission paths for traffic in voice and/or data networks, independent of network management, comprising:
  a) terminal means for accessing or receiving from the networks voice and/or data transmissions;
  b) a voice and data multiplexer coupled to the terminal means;
  c) a voice and/or data switch coupled at one end to the multiplexer and at the other end to the voice network;
  d) a programmable network interface coupled to the multiplexer and to the data network; the interface including programmable stored data descriptive of authorized network data and voice functions and transmission paths in the voice and data networks; the interface being further linked to the multiplexer and the switch through signaling paths for directing the operation of the multiplexer and switch in selecting paths for voice and data transmission to/from the voice and data networks;
  e) control means linked to the interface, the switch and the voice network through signaling paths for directing traffic on the voice network and/or data network in accordance with instructions provided in part from the interface; and
  f) means for displaying menus provided by the interface at the terminal equipment for enabling a user, in real time, to activate and select voice and/or data services and transmission paths in the voice and/or data networks from the menus based upon the stored data in the interface and the selection being independent of the network management.

2. The system of claim 1 further including a computer and a voice device included in the terminal means.

3. The system of claim 2 wherein the multiplexer is a digital subscriber line access multiplexer for directing voice and data transmission to either the voice or data networks according to instruction provided by the programmable interface.

4. The system of claim 3 further including a server for coupling the programmable interface to the data network.

5. The system of claim 4 wherein the programmable interface is a client server.

6. The system of claim 5 wherein the multiplexer directs voice or data to the voice network according to instructions provided by the interface.

7. The system of claim 6 wherein the multiplexer directs voice or data to the data network according to instructions provided by the interface.

8. The system of claim 7 further including means included in the interface for displaying menus at the terminal equipment indicative of services and transmission paths available on the voice and data networks.

9. The system of claim 8 further including means for programming the interface to change services and transmission paths available on the voice and data networks.

10. The system of claim 9 wherein the interface provides instruction to the switch, multiplexer and a service control point in the voice network for selecting transmission paths in the data and voice networks according to selections made from the menus by a user.

11. The system of claim 10 wherein the voice network is a public switched telephone network and the data network is a distributed information system.

12. The system of claim 11 wherein the distributed information system is the Internet.

13. In a communication system for voice and/or data traffic having terminal means coupled to a multiplexer; a programmable data network interface coupled to the multiplexer and to a data network; a switch coupled to the multiplexer and to a public switched network and a control means linked to the interface and the switch through signaling paths, a method for user activation and selection, in real time, of transmission paths for voice and/or data traffic in a data or public switched networks according stored instruction in the interface and the selection being independent of system management comprising the steps of:
  a) storing voice and data functions and transmission paths authorized by system management in the programmable data network interface; the interface linked to the multiplexer, the switch and the control means through signaling paths;
  b) displaying menus at the terminal equipment enabling a user, in real time, to activate and select voice and/or data services and transmission paths in the voice and/or data networks based upon the stored instruction in the interface;
  c) selecting the authorized voice and data functions and transmission paths from the menus and transmitting the selections and paths to the interface through the multiplexer; and
  d) signaling the control means, the switch and the multiplexer from the interface to activate the authorized voice and/or data function and transmission paths in the voice and/or data network from the user selected voice and/or data services and transmission paths at the terminal means.

14. In a communication system for voice and/or data traffic having terminal means coupled to a multiplexer; a programmable data network interface coupled to the multiplexer and to a data network; a switch coupled to the multiplexer and to a voice network and a control means linked to the interface, the voice network and the switch through signaling paths, a method for user activation and selection, in real time, of transmission paths for voice and/or data traffic in a data or public switched networks according to stored instruction in the interface and independent of system management comprising the steps of:
  a) negotiating with a local telephone company for bandwidth, level of service in voice and data paths authorized by the telephone company policies;
  b) programming an update of a user AIN profiles at the control means, the switch, the interface and the multiplexer;
  c) determining the active status of the terminal means;
  d) initiating traffic at the terminal based upon instructions provided by the interface after connection thereto;

e) determining whether voice traffic is to be initiated;

f) initiating a "data only" indicator in the interface; initiating a "voice only" indicator in the interface; or g) initiating a "data and voice indicator" in the interface; and h) activating the multiplexer for directing the voice and/or data traffic originating from the terminal to the voice and/or data networks in accordance with the instructions stored in the interface and selections made by a user operating the terminal equipment.

15. An article of manufacture, comprising:

a computer usable medium having computer readable program code means embodied therein for user activation and selection, in real time, of transmission paths for voice and/or data traffic in a data or voice network at a terminal, according to stored instructions in a programmable interface and independent of network management, the computer readable program code means in said article of manufacture comprising:

a) computer readable program code means for storing voice and data functions and transmission paths authorized by network management in the programmable network interface; the interface linked to a multiplexer, a switch and a control means through signaling paths;

b) computer readable program code means for displaying menus at the terminal enabling a user, in real time, to activate and select voice and/or data services and transmission paths in the voice and/or data networks based upon the stored instructions in the interface;

c) computer program code means for selecting authorized voice and data functions and transmission paths from the menus and transmitting the selections and paths to the interface through the multiplexer; and d) computer readable program code means for signaling the control means, the switch and the multiplexer from the interface to activate the authorized voice and/or data function and transmission paths in the voice and/or data network from the user selected voice and/or data services and transmission paths at the terminal means.

* * * * *